United States Patent
Ranganathan et al.

(10) Patent No.: US 11,238,019 B2
(45) Date of Patent: Feb. 1, 2022

(54) DISTRIBUTED DATABASE SYSTEMS PARTITION MERGE

(71) Applicant: Microsoft Technology Licensing, LLC, Redmond, WA (US)

(72) Inventors: Bhalakumaaran Erode Ranganathan, Bellevue, WA (US); Pankaj Sharma, Kirkland, WA (US); Padma Priya Aradhyula Bhavani, Bellevue, WA (US); Harini Chintapally, Redmond, WA (US); Krishna Pradeep Reddy Tamma, Bothell, WA (US); Bhavya Malik, Vancouver (CA); Rama Krishnan Raghupathy, Bellevue, WA (US); Ailidani Ailijiang, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 54 days.

(21) Appl. No.: 16/888,401

(22) Filed: May 29, 2020

(65) Prior Publication Data

US 2021/0374113 A1    Dec. 2, 2021

(51) Int. Cl.
*G06F 16/00* (2019.01)
*G06F 16/215* (2019.01)

(52) U.S. Cl.
CPC .................. *G06F 16/215* (2019.01)

(58) Field of Classification Search
None
See application file for complete search history.

(56) References Cited

U.S. PATENT DOCUMENTS

| | | | |
|---|---|---|---|
| 2017/0004527 A1* | 1/2017 | Wu | G06Q 30/0277 |
| 2018/0278491 A1* | 9/2018 | Johnsen | H04L 41/0806 |
| 2019/0243821 A1* | 8/2019 | Duhamel | G06F 16/2379 |

* cited by examiner

*Primary Examiner* — Bai D Vu
(74) *Attorney, Agent, or Firm* — Fiala & Weaver P.L.L.C.

(57) ABSTRACT

Partitions are enabled to be merged in storage device of distributed database systems. A request to merge a plurality of source partitions into a merged partition is received. Each source partition stores a plurality of data items having corresponding source global identifiers and corresponding source local identifiers. The data items, with corresponding metadata, are appended from the source partitions to an intermediate storage structure in an order defined by the source local identifiers. Target global identifiers and target local identifiers are generated for each of the data items in the intermediate storage structure. The copied data items are flushed from the intermediate storage structure to the merged partition in an order defined by the target global identifiers. The source partitions and intermediate storage structure may then be purged of data, removed, and/or reused for further storage needs.

20 Claims, 7 Drawing Sheets

200

202
Receive a request to merge a plurality of source partitions into a merged partition, each source partition storing a plurality of data items having corresponding source global identifiers and corresponding source local identifiers 204
Append the data items with corresponding metadata from the source partitions to an intermediate storage structure in an order defined by the source local identifiers 206
Generate target global identifiers and target local identifiers for each of the data items in the intermediate storage structure 208
Flush the copied data items from the intermediate storage structure to the merged partition in an order defined by the target global identifiers

400

402
Cause a replicator to copy the data items of the source partition with corresponding metadata to the intermediate storage structure in an order defined by their source local identifiers, the corresponding metadata for each data item including a corresponding source global identifier, a corresponding source local identifier, and a timestamp

404
Include the target global identifier and target local identifier generated for each copied data item in the metadata corresponding to the copied data item

502
Set the target global identifier of the copied data item to the source global identifier of the copied data item

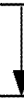

504
Set the target local identifier of the copied data item to a next available local identifier in a sequence of available local identifiers for the merged partition

FIG. 5

DISTRIBUTED DATABASE SYSTEMS PARTITION MERGE

BACKGROUND

A distributed database system is a system of databases in which data is stored across different physical locations. The database is typically stored in multiple storage devices dispersed over a network of interconnected computers. Replication and/or duplication may be used to help ensure that distributed databases remain up-to-date and current. "Replication" involves identifying changes in a distributed database, and replicating the changes to redundant copies of the database. "Duplication" identifies one database as a master and then duplicates that database to one or more secondary copies of the database.

In a distributed database system, storage may be segmented into partitions. Multiple partitions may be created in storage to serve a particular customer account to meet elastic throughput requirements of the customer. For example, if a single partition can handle only X requests/sec, when customer requirements are Y requests/sec, then Y/X number of new/additional partitions may be created to scale up to meet customer demand. When the customer reduces/scales down their throughput requirements, however, partitions previously created for the customer may end up underutilized or completely unused.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided in computing devices, such as a storage device, for merging partitions. The contents of multiple source partitions are copied to an intermediate storage structure (e.g., a merge log), and then to a merged partition. In this manner, unused storage space on the source partitions may be reclaimed.

In one example aspect, a request to merge a plurality of source partitions into a merged partition is received. Each source partition stores a plurality of data items having corresponding source global identifiers and corresponding source local identifiers. The data items, with corresponding metadata, are appended from the source partitions to an intermediate storage structure in an order defined by the source local identifiers. Target global identifiers and target local identifiers are generated for each of the data items in the intermediate storage structure. The copied data items are flushed from the intermediate storage structure to the merged partition in an order defined by the target global identifiers. The source partitions and intermediate storage structure may then be purged of data, removed, and/or reused for further storage needs.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 is a flowchart providing a method for appending source partitions into an intermediate storage structure, according to an example embodiment.

FIG. 5 is a flowchart providing a method for generating target identifiers for copied data, according to an example embodiment.

Figure 1:
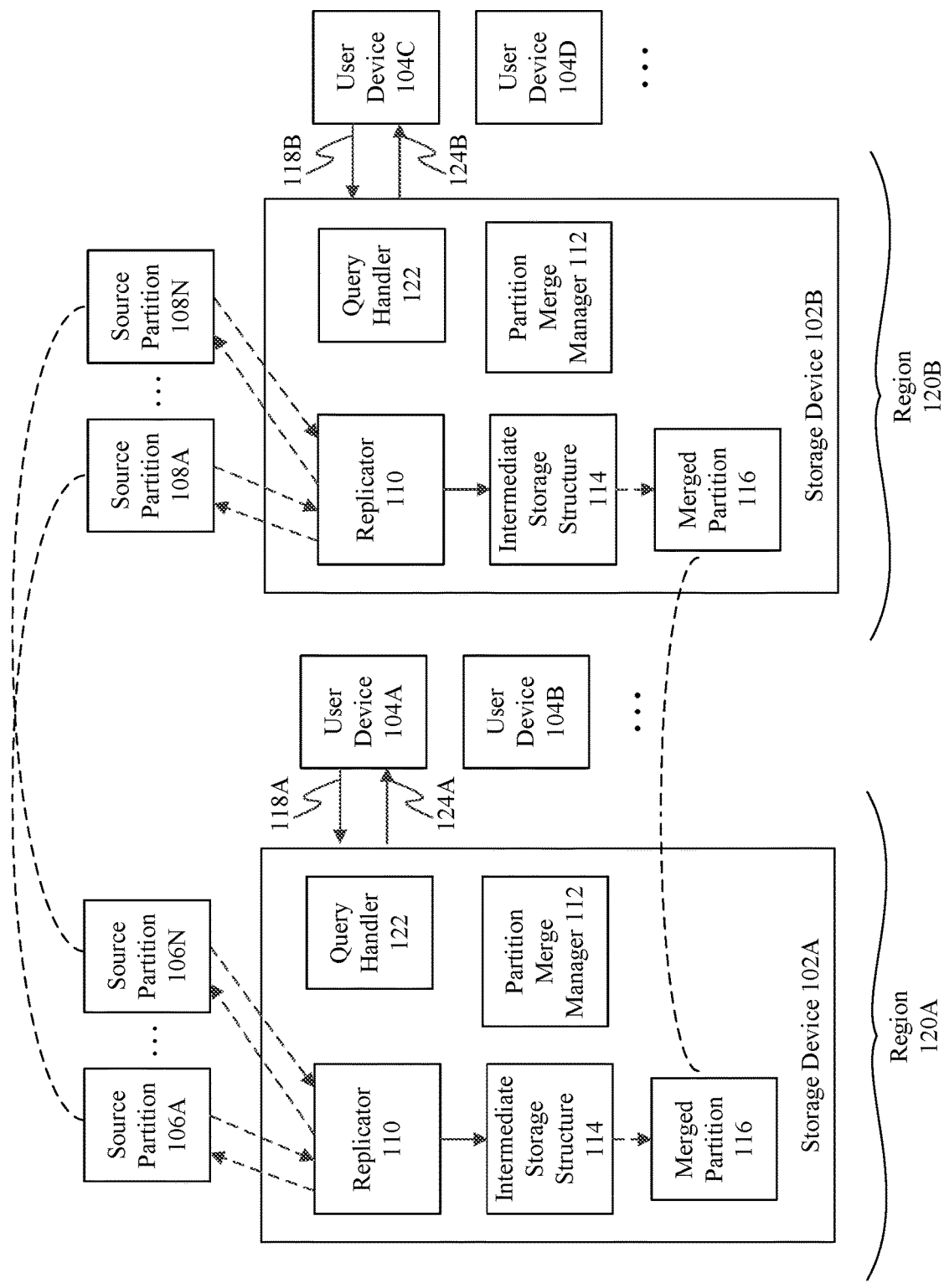
FIG. 1 is a block diagram of a multi-region distributed database system configured for partition merging, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

A distributed database system is a system of databases in which data is stored across different physical locations. The database is typically stored in multiple storage devices dispersed over a network of interconnected computers. Replication and/or duplication may be used to help ensure that distributed databases remain up-to-date and current. "Replication" involves identifying changes in a distributed database, and replicating the changes to redundant copies of the database. "Duplication" identifies one database as a master and then duplicates that database to one or more secondary copies of the database.

In a distributed database system, storage may be segmented into partitions. Multiple partitions may be created in storage to serve a particular customer account to meet elastic throughput requirements of the customer. For example, if a single partition can handle only X requests/sec, when customer requirements are Y requests/sec, then Y/X number of new/additional partitions may be created to scale up to meet customer demand. When the customer reduces/scales down their throughput requirements, however, partitions previously created for the customer may end up underutilized or completely unused.

Embodiments described herein overcome these issues with underutilized or unused partitions by shrinking or merging multiple source partitions into a single "merged" partition. In this manner, storage space in storage devices may be reclaimed for greater efficiency in storage utilization. For example, after a merging of source partitions, the source partitions may be reallocated as storage for the same or other users. Furthermore, the stored data on the merged partition may be accessed more efficiently (e.g., faster, with fewer processor cycles, etc.) than previously when the data was spread over multiple partitions. Such embodiments for merging partitions may be implemented in various types of environments and in various ways.

For instance, FIG. 1 is a block diagram of a multi-region distributed database system 100 configured for partition merging, according to an example embodiment. As shown, system 100 includes first and second storage devices 102A and 102B, source partitions 106A-106N, user devices 104A-104D, and source partitions 108A-108N. Storage device 102A and storage device 102B each include an instance of a replicator 110, a partition merge manager 112, an intermediate storage structure 114, a merged partition 116, and a query handler 122. First storage device 102A and source partitions 106A-106N are located in a first region 120A, and second storage device 102B and source partitions 108A-108N are located in a second region 120B. Each of these features of system 100 are described in further detail as follows.

Although four user devices 104A-104D are shown in FIG. 1, any number of user devices may be present, including hundreds, thousands, millions, and even greater numbers of user devices. The user devices submit data operations in queries to databases stored in storage devices of system 100. For instance, user device 104A is shown submitting (transmitting) a data operation request 118A that is received by query handler 122 of storage device 102A in region 120A, and receiving a data operation response 124A from query handler 112 of storage device 102A. Furthermore, user device 104B is shown submitting a data operation request 118B that is received by query handler 122 of storage device 102B in region 120B, and receiving a data operation response 124B from query handler 122 of storage device 102B. Example of data operations that may be submitted in queries/requests include data writes to a database in storage, data reads from a database in storage, etc. The data operation requests may be structured in any manner, including according to SQL (structured query language), or in any other suitable manner. Such data operation requests and responses are described in further detail elsewhere herein.

User devices 104A-104D may include any suitable computing device, including each being a stationary computing device such as a desktop computer or personal computer, a super computer, a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a gaming console/system (e.g., Microsoft Xbox®, Sony PlayStation®, Nintendo Wii® or Switch®, etc.), etc.

User devices 104A-104D communicate with storage devices 102A and 102B over one or more networks. The network(s) may include one or more of any of a local area network (LAN), a wide area network (WAN), a personal area network (PAN), a combination of communication networks, such as the Internet, and/or a virtual network. User devices 104A-104D and storage devices 102A and 102B may each include at least one network interface that enables such communications. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Although two storage devices 102A and 102B are shown in FIG. 1, any number of storage devices may be present. Storage devices 102A and 102B each include storage media for storing data items in the form of databases, tables, documents, and/or other form. For instance, storage devices 102A and 102B may each comprise one or more storage disks, hard disk drives, solid-state devices (SSDs), random access memory (RAM) devices, etc. In embodiments, the storage of storage devices 102A and 102B may be logically segmented into "partitions," where each partition contains a particular designated amount of storage. For instance, a first partition may be designated as a particular storage medium such as a storage disk or a solid state drive. In other embodiments, the first partition may be designated as a portion of a storage disk, as portions multiple storage disks, as multiple storage disks, as a portion of a solid state drive, as portions of multiple solid state drives, as multiple solid stat drives, as a combination of multiple types of storage, etc.

Examples of partitions include source partitions 106A-106N and 108A-108N shown in FIG. 1. Although shown as separate from storage devices 102A and 102B, in an embodiment, one or more of source partitions 106A-106N may be included in storage device 102A, and one or more of source partitions 108A-108N may be included in storage device 102B. Alternatively, source partitions 106A-106N may be included in one or more other storage devices in region 120A, and source partitions 108A-108N may be included in one or more other storage devices in region 120B. Source partitions and storage devices, when separate from each other, may communicate over any suitable network mentioned elsewhere herein or otherwise known, using any suitable communication protocols and network interface types.

In an embodiment, storage devices 102A and 102B (and source partitions 106A-106N and 108A-108N) may be included in network-based storage, such as "cloud" storage in datacenters or elsewhere. Such storage may be accessible in or via any number of servers, such as a network-accessible server (e.g., a cloud computing server network), each accessible by a network such as the Internet (e.g., in a "cloud-based" embodiment) to store, manage, and/or process data. Such servers and/or storage may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, servers and storage of region 120A may be co-located (e.g., housed in one or more nearby buildings with associated components such as backup power supplies, redundant data communications, environmental controls, etc.) to form a datacenter, or may be arranged in other manners, and storage of region 120B may be organized in a similar or different fashion. Accordingly, in an embodiment, distributed database system 100 may be included in a distributed collection of datacenters.

Although two regions 120A and 120B are shown in FIG. 1, any number of regions may be present. Each region is a locality or geographical region, such as a city, a state, a region of a country, an entire country, a portion of a continent, an entire continent, etc. Examples of regions include Washington State USA, Western Europe, Northern India, etc. Regions 120A and 120B are geographically separate for reasons of data safety (e.g., protecting against localized failures), as described as follows.

In an embodiment, system 100 distributes a distributed database across regions 120A and 102B (and optionally further regions). For example, region 120A may be considered a hub region and region 102B may be considered a satellite region. In an embodiment, there is no difference between a hub region and a satellite region, in that they are symmetrical, storing the same data and both configured to accept customer requests to that data.

For example, storage in region 120A and be linked to storage in region 120B. Each of source partitions 106A-106N may store different customer data, with source partitions 108A-108N also storing that data, such that source partitions 106A and 108A store the same data, source partitions 106N and 108N store the same data, etc. In such case, source partition 106A is linked to source partition 108A, referred to as a "partition-set," meaning the data in source partition 106A is the same as the data in source partition 108A. Partition sets are "geo-linked" in-order to serve the same data (e.g., the data of a same customer) across multiple regions. Similarly, source partitions 106N and 108N are geo-linked and are another partition-set holding different data compared to source partitions 106A and 106A, though the same data is stored in source partitions 106N and 108N. For geo-linked partition sets, a write of data to a first partition in the set is replicated to the other partition(s) of the partition set (e.g., is transmitted from the first partition to the other partition(s) to be implemented in those other partition (s)).

As described above, system 100 is configured for partition merging, where the data stored on source partitions of any number is merged into a merged partition. In the example of FIG. 1, source partitions 106A-106N in region 120A may be merged into a target partition, shown as merged partition 116 in storage device 102A of region 120A. Similarly, in region 120B, source partitions 108A-108 in region 120B may be merged into a target partition, shown as merged partition 116 in storage device 102B of region 120B. Each of regions 120A and 120B merges its source partitions independently within its own region. At the end of the merge, merged partition 116 of storage device 102A of region 120A is geo-linked to merged partition 116 in storage device 102B of region 120B, meaning a new partition-set is created that hosts the union of customer data that was contained in source partitions 106A-106N and 108A-108N. Hence, multiple (two or more) source partitions are merged into one target partition in each region thereby reducing overall storage-related cost of goods sold (COGS), while at the same time continuing to meet customer needs without interruption.

In particular, in each of storage devices 102A and 102B, the respective replicator 110 and partition merge manager 112 operate to merge selected source partitions (of the respective region) into a merged partition, on demand or as otherwise needed. In an embodiment, in each of storage devices 102A and 102B, partition merge manager 112 directs replicator 110 to copy data from the corresponding source partitions (source partitions 106A-106N or 108A-108N, depending on whether region 120A or region 120B) to intermediate storage structure 114, which may also be referred to as a "merge log". In an embodiment, intermediate storage structure 114 is itself a storage partition into which replicator 110 copies the data (e.g., data operations) and corresponding metadata (data operation timestamps, data operation identifiers, etc.) from the corresponding source partitions. Partition merge manager 112 generates new identifiers for the data, and subsequently copies (or directs replicator 110 to copy) the data from intermediate storage structure 114 into merged partition 116. Intermediate storage structure 114 and the source partitions from which data was copied may then be reallocated for storage needs elsewhere.

Figure 2:
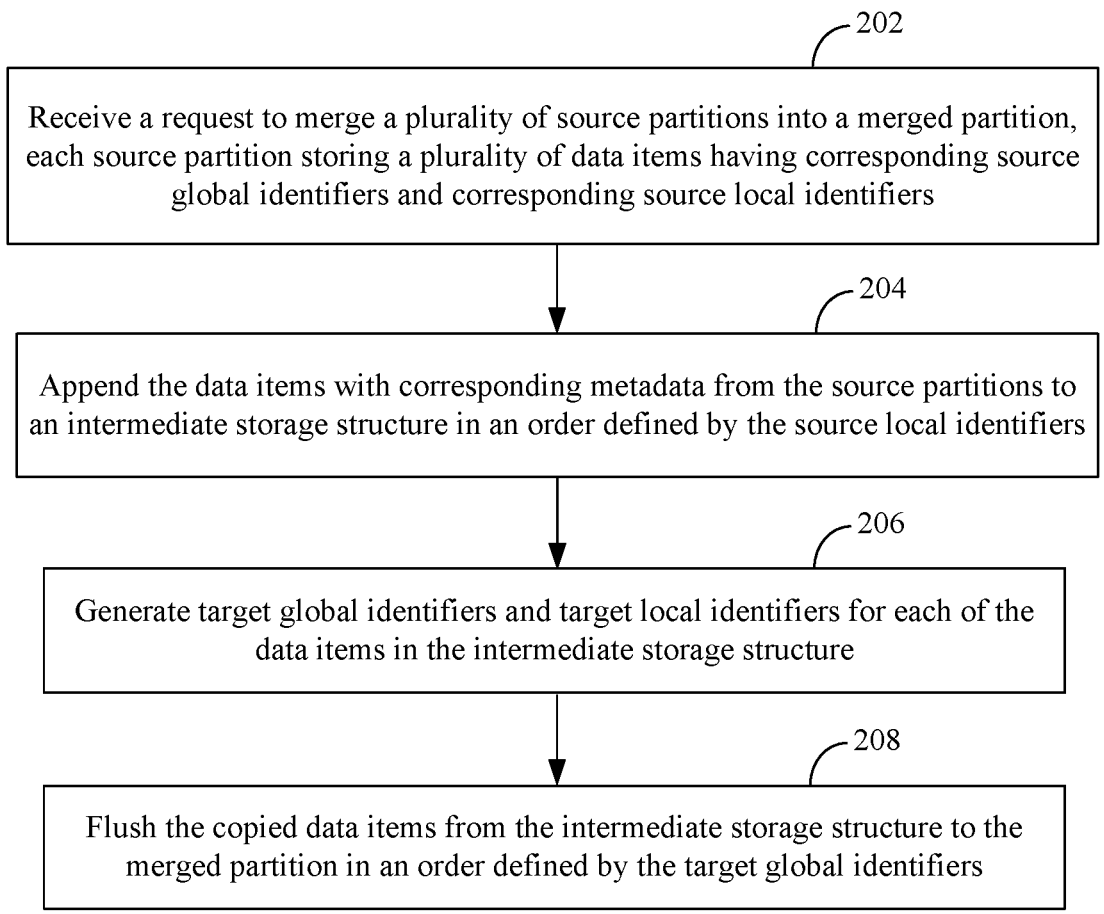
FIG. 2 is a flowchart providing a method for merging multiple partitions into a merged partition, according to an example embodiment.
Figure 3:
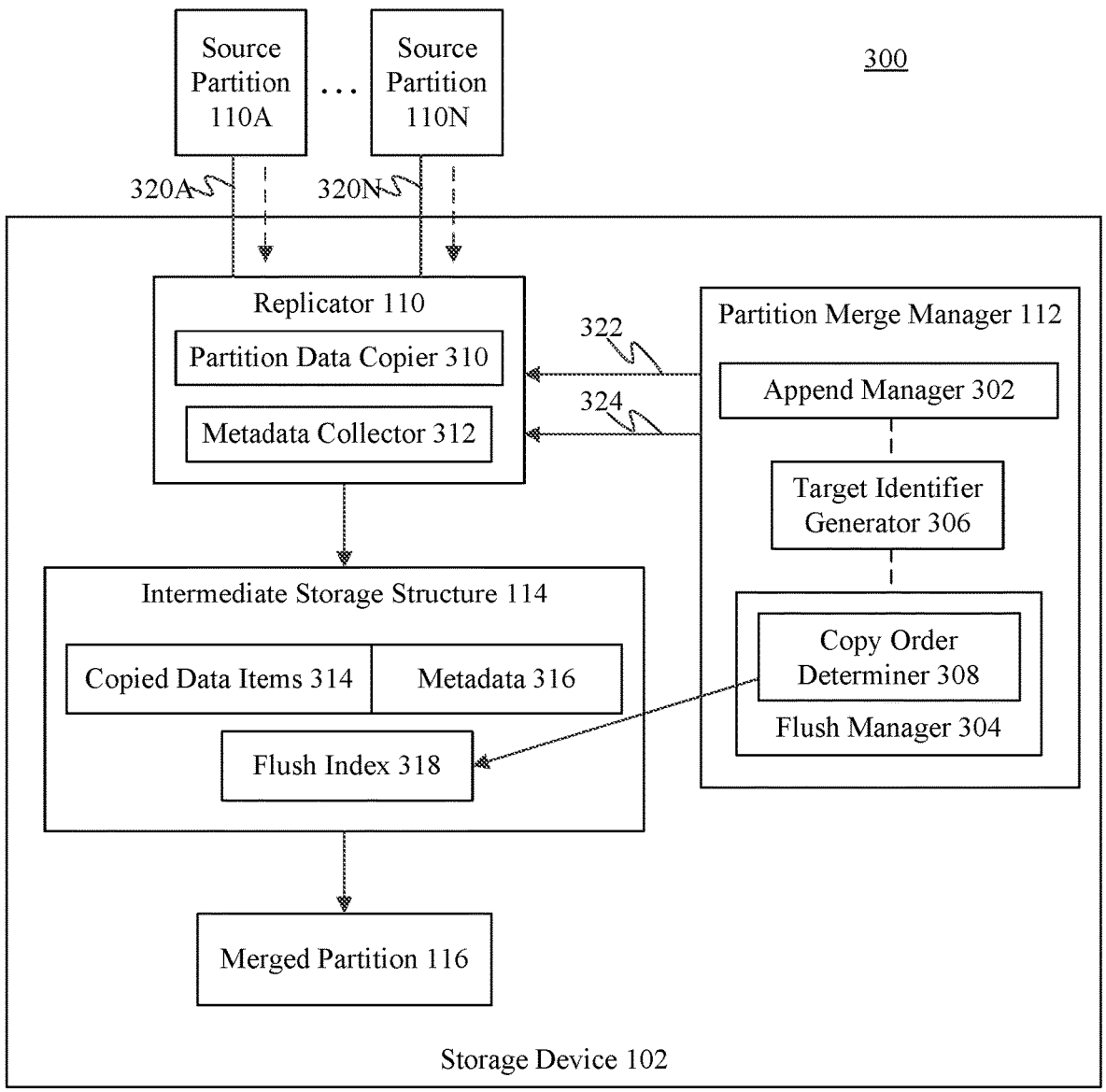
FIG. 3 is a block diagram of a storage device configured for partition merging, according to an example embodiment.

In embodiments, storage devices 102A and 102B may operate in various ways to perform merging of partitions, and may be configured in various ways. For instance, FIG. 2 is a flowchart 200 providing a method for merging multiple partitions into a merged partition, according to an example embodiment. In an embodiment, flowchart 200 may be performed by each of storage devices 102A and 102B independently. For purposes of illustration, flowchart 200 of FIG. 2 is described with reference to FIG. 3. FIG. 3 is a block diagram of a storage device 102 configured for partition merging, according to an example embodiment. Storage device 102 is an example of each of storage devices 102A and 102B. As shown in FIG. 3, storage device 102 includes replicator 110, partition merge manager 112, intermediate storage structure 114, and merged partition 116. Replicator 110 includes a partition data copier 310 and a metadata collector 312. Partition merge manager 112 includes an append manager 302, a flush manager 304, and a target identifier generator 306. Append manager 302 and flush manager 304 each utilize target identifier generator 306 for the generation of target identifiers, as described in further detail below. Flush manager 304 includes a copy order determiner 308. These features of FIG. 3 are described as follows with respect to flowchart 200 of FIG. 2.

Flowchart 200 begins with step 202. In step 202, a request to merge a plurality of source partitions into a merged partition is received, each source partition storing a plurality of data items having corresponding source global identifiers and corresponding source local identifiers. In embodiments, it may be requested that two or more source partitions, such as source partitions 110A and 110N be merged into a single partition. For example, a request may identify the partitions by partition key, which is a unique value in a partition key space that defines partition keys for large numbers of partitions. A request to merge partitions may be generated automatically or manually. For example, a garbage collection process, or other process, may monitor partitions for underutilization. If such underutilization is detected for a partition (e.g., an amount of used storage of the partition falls below a predetermined threshold), the partition may be designated as such. If multiple such partitions are determined (e.g., that may be associated with a same user, same customer, or other same entity such that they may be merged without loss of security, privacy, etc.), the multiple such partitions designated as underutilized may be selected for merging. The garbage collection process (or other process) may generate a request to merge the partitions that is received by partition merge manager 112. In another embodiment, a user (e.g., a customer, a system administrator, etc.) may manually select multiple partitions for merging (e.g., via a user interface). The manual selection may be received by partition merge manager 112 as a request to merge the selected partitions.

It is noted that in embodiments, each data item stored in partitions may have one or more corresponding identifiers as well as further associated metadata. For instance, each data item in a given partition is identified by a unique identifier referred to as a global identifier, which may be a log sequence number (LSN) or other global identifier type. In an embodiment, the global identifiers are numbered in a monotonically increasing fashion, such that the numbering enables determining a global ordering/causality of data operations of the data items, including indicating which of a data operation 1 or a data operation 2 happened first (a lower-valued global identifier occurs earlier than a higher-valued global identifier). Such global ordering enables system 100 of FIG. 1 to provide user/customer offerings such as change feed, session consistency etc. Furthermore, embodiments preserve the global ordering to avoid adverse impact in terms of availability and consistency guarantees even while a partition merge is performed. Users are enabled to continue to perform operations on the stored data without disruptions while a partition merge is performed.

In embodiments, each source partition is independent and receives a non-uniform load of user data operations. For instance, source partition 106A may receive and process X operations while source partition 106N may receive and process Y operations, and their global identifiers are separately assigned and grow independent of each other. The same global identifier generated by source partition 106A for a data item is not necessarily generated by source partition 106N, and their sets of global identifiers may be disjoint (no elements in common) as well, or may have overlap. Embodiments enable merging of data items from independent source partitions while also retaining global ordering.

In an embodiment, system 100 of FIG. 1 can receive data write operations in any region and such writes local to a region are made available/visible to all other regions by replication of the data write operations, such as by Active-Active replication or Active-Passive replication. Hence, in an embodiment, system 100 preserves local ordering in addition to global ordering. To achieve that, a second identifier may be provided for each data item referred to as a local identifier with similar properties as the global identifier described above. The local identifier enables preservation of local ordering. It is noted that for a given data item that is transferred or copied from a source partition to a target partition, the source global identifier (global identifier used at the source partition) is maintained and thus is equal to the target global identifier for the data item (global identifier used at the target partition), while the target local identifier (local identifier used at the target partition) is not set equal to the source local identifier (local identifier used at the source partition) but is usually different.

Referring back to flowchart 200 (FIG. 2), in step 204, the data items with corresponding metadata are appended from the source partitions to an intermediate storage structure in an order defined by the source local identifiers. In an embodiment, partition merge manager 112 is configured to cause the appending (ordered copying) of data items from the source partitions indicated for merging to intermediate storage structure 114. In particular, append manager 302 of partition merge manager 112 is configured to manage the appending. In an embodiment, append manager 302 provides an append instruction 322 that is received by replicator 110. Append instruction 322 indicates the source partitions for appending to intermediate storage structure 114, which, for example, may be source partitions 110A and 110N. In response, replicator 110 is configured to copy all data items from the indicated source partitions into intermediate storage structure 114, along with metadata of the data items, such as timestamps (e.g., of data items that are data write operations) and data identifiers.

In an embodiment, replicator 110 establishes communication links with the indicated source partitions when communications are made over a network. For instance, as shown in FIG. 3, replicator 110 established a first link 320A with source partition 110A and a second link with source partition 110N. Any suitable type of communication link may be used. For instance, a TCP (Transmission Control Protocol) link may be used, or other type of link.

Partition data copier 310 of replicator 110 is configured to copy the data items from the indicated source partitions into intermediate storage structure 114 as copied data items 314. Furthermore, metadata collector 312 of replicator 110 is configured to collect metadata of the data items from the source partitions and copy the metadata into intermediate storage structure 114 as metadata 316. The transfer of data items 314 and metadata 316 over links 320A and 320N is indicated in FIG. 3 by dotted line arrows.

Examples of copied data items 314 include data records, data operations, documents, tables, and any other types of data items mentioned elsewhere herein or otherwise known. Examples of metadata 316 associated with copied data items 314 include timestamps (e.g., timestamps of data write operations), source global identifiers, source local identifiers, and other types of metadata mentioned elsewhere herein or otherwise known.

Referring back to flowchart 200 (FIG. 2), in step 206, target global identifiers and target local identifiers are generated for each of the data items in the intermediate storage structure. In embodiments, target identifier generator 306 is configured to generate target identifiers for each of copied data items 314. The generated target identifiers are stored in metadata 316 and are used to identify the data items after transfer to merged partition 116.

In embodiments, target identifier generator 306 may generate target global identifiers and target local identifiers on behalf of append manager 302 in various ways. For instance, FIG. 4 is a flowchart 400 providing a method for appending source partitions into an intermediate storage structure, according to an example embodiment. In an embodiment, flowchart 400 may be performed by append manager 302, including target identifier generator 306. For the purposes of illustration, flowchart 400 is described with continued reference to FIG. 3.

Flowchart 400 begins with step 402. In step 402, a replicator is caused to copy the data items of the source partition with corresponding metadata to the intermediate storage structure in an order defined by their source local identifiers, the corresponding metadata for each data item including a corresponding source global identifier, a corresponding source local identifier, and a timestamp. For instance, as described above, append manager 302 is configured to instruct replicator 110 to copy the data items of the selected source partitions with corresponding metadata to intermediate storage structure 114. In an embodiment, replicator 110 copies the data items of each source partition with corresponding metadata to intermediate storage structure 114 in an order defined by their source local identifiers. In other words, as described above, a source partition assigns local identifiers to the data items stored by the source partition, referred to as source local identifiers. Each source partition assigns its own local identifiers to the data items stored by the source partition independent of the other source partitions. A source partition assigns local identifiers to its data items in a sequential order, incrementing the local identifier by one for each next stored data item being assigned one. As such, replicator 110 is configured to copy the data items from a source partition in the order of the local identifiers of that source partition.

Note that replicator 110 may copy data items from the multiple source partitions serially, in parallel, or in any other manner, as long as each source partition sends its data items to replicator 110 in order of the local identifiers of its own data items (sending the source local identifiers sequentially and in increasing order).

In step 404, the target global identifier and target local identifier generated for each copied data item are included in the metadata corresponding to the copied data item. In an embodiment, append manager 302 instructs target identifier generator 306 to generate target identifiers for each of copied data items 314, including global and local identifier for each copied data item. The generated target identifiers are stored in metadata 316 and are used to identify the data items after transfer to merged partition 116.

In embodiments, target identifier generator 306 may generate target identifiers in various ways. For instance, FIG. 5 is a flowchart 500 providing a method for generating target identifiers for copied data, according to an example embodiment. In an embodiment, flowchart 500 may be performed by target identifier generator 306. For the purposes of illustration, flowchart 500 is described with continued reference to FIG. 3.

Flowchart 500 begins with step 502. In step 502, the target global identifier of the copied data item is set to the source global identifier of the copied data item. In an embodiment, target identifier generator 306 is configured to use the source global identifier as the target global identifier for each data item. In such an embodiment, the global identifiers of data items do not change when moving from the source partitions to the merged partitions. However, in other embodiments, target global identifiers for data items may be selected/generated in alternative ways.

In step 504, the target local identifier of the copied data item is set to a next available local identifier in a sequence of available local identifiers for the merged partition. In an embodiment, target identifier generator 306 is configured to generate a new local identifier to be the target local identifier for data items copied from the source partitions. For example, each data item copied over from a source partition may receive a next local identifier value in a sequence of target local identifiers that begins with an initial value and increments by one each time (e.g., 001, 002, 003, etc.). Note that the next target local identifier is assigned to a next data item regardless of the source partition from which the data item is received.

For instance, the following sequence of data items may be copied from source partitions 110A and 110N to intermediate storage structure 114 and assigned the following example identifiers by target identifier generator 306, as shown in Table 1:

TABLE 1

| Source Partition | Data Item | Source Global Identifier, Source Local Identifier | Target Global Identifier, Target Local Identifier |
| --- | --- | --- | --- |
| 110A | Document 1  | 001, 002 | 001, 001 |
| 110B | Document 5  | 001, 006 | 001, 002 |
| 110B | Document 7  | 003, 008 | 003, 003 |
| 110A | Document 11 | 012, 003 | 012, 004 |
| 110B | Document 13 | 008, 011 | 008, 005 |
| 110A | Document 17 | 013, 005 | 013, 006 |

As shown in Table 1, replicator 110 copied three data items ("Documents") from each of source partitions 110A and 110B to intermediate storage structure 114. Furthermore, target identifier generator 306 set the target global identifiers for all six data items to their respective source global identifiers, and set the target local identifiers for the six data items in numerical sequence in the order in which the data items were copied from the source partitions. In other words, the target local identifier of a copied data item is set to a next available local identifier in a sequence of available local identifiers for the target partition, merged partition 116. The target global and local identifiers may be stored in metadata 316.

Referring back to flowchart 200 (FIG. 2), in step 208, the copied data items are flushed from the intermediate storage structure to the merged partition in an order defined by the target global identifiers. In an embodiment, partition merge manager 112 is configured to cause the flushing (copying) of data items from intermediate storage structure 114 to merged partition 116. In particular, flush manager 304 of partition merge manager 112 is configured to manage the flushing. In an embodiment, flush manager 304 provides a flush instruction 324 that is received by replicator 110. Flush instruction 324 indicates copied data items 314 and metadata 316 in intermediate storage structure 114 are to be copied to merged partition 116. In response, replicator 110 is configured to copy copied data items 314 and metadata 316 from intermediate storage structure 114 to merged partition 116. In an embodiment, replicator 110 copies copied data items 314 and metadata 316 from intermediate storage structure 114 in an order defined by the target global identifiers assigned to each of copied data items 314 (and maintained in metadata 316) that were generated by target identifier 306. In an embodiment, flush manager 304 may access the target global identifiers generated by target identifier 306 directly from target identifier 306 and/or directly from metadata 316 in intermediate storage 114.

For instance, with regard to the example of Table 1 above, replicator 110 may copy Documents 1, 5, 7, 11, 13, and 17 from intermediate storage structure 114 to merged partition 116 in the order shown below in Table 2.

TABLE 2

| Data Item | Target Global Identifier, Target Local Identifier | Copy Order |
| --- | --- | --- |
| Document 1 | 001, 001 | 1 |
| Document 5 | 001, 002 | 2 |
| Document 7 | 003, 003 | 3 |
| Document 13 | 008, 005 | 4 |
| Document 11 | 012, 004 | 5 |
| Document 17 | 013, 006 | 6 |

As shown in Table 2, Documents 1, 5, 7, 11, 13, and 17 are copied in order of their target global identifiers, and thus are copied, from least to greatest.

Figure 6:
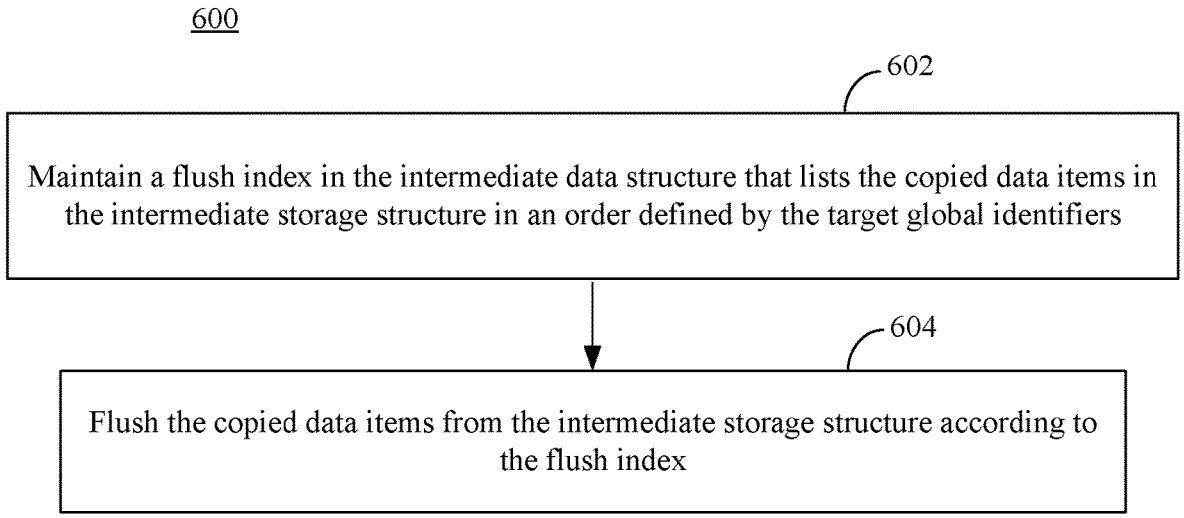
FIG. 6 is a flowchart providing a method for utilizing a flush index for flushing data items in an order according to target global identifiers, according to an example embodiment.

In embodiments, flush manager 304 may managed the copying of data items from intermediate storage structure 114 to merged partition 116 in order of target global identifiers in any suitable manner. For instance, FIG. 6 is a flowchart 600 providing a method for utilizing a flush index for flushing data items in an order according to target global identifiers, according to an example embodiment. In an embodiment, flowchart 600 may be performed by copy order determiner 308 of flush manager 304. For the purposes of illustration, flowchart 600 is described with continued reference to FIG. 3.

Flowchart 600 begins with step 602. In step 602, a flush index in the intermediate data structure is maintained that lists the copied data items in the intermediate storage structure in an order defined by the target global identifiers. In an embodiment, copy order determiner 308 is configured to generate and maintain a flush index 318. Flush index 318 includes an indexed listing of copied data items 314 by their target global identifiers. For example, in an embodiment, as data items are added to copied data items 314, copy order determiner 308 inserts entries for the added data items into flush index 318 that are positioned in order of their target global identifiers. Alternatively, after all data items have been copied to copied data items 314 in intermediate storage structure 114 from the source partitions, copy order determiner 308 generates flush index 318 to list the data items order of their target global identifiers.

For instance, continuing the examples of Tables 1 and 2 above, copy order determiner 308 may generate flush index 318 as follows, shown as Table 3:

TABLE 3

| Target Global Identifier, Target Local Identifier | Data Item |
| --- | --- |
| 001, 001 | Document 1 |
| 001, 002 | Document 5 |
| 003, 003 | Document 7 |
| 008, 005 | Document 13 |
| 012, 004 | Document 11 |
| 013, 006 | Document 17 |

In step 604, the copied data items are flushed from the intermediate storage structure according to the flush index. In an embodiment, replicator 110 copies copied data items 314 and metadata 316 from intermediate storage structure 114 in an order defined by flush index 318 to merged partition 116. In this manner, replicator 110 copies copied data items 314 to merged partition 116 in an order defined by their target global identifiers.

For instance, in the example of Table 3 above, replicator 110 copies the data items from intermediate storage structure 114 to merged partition 116 in the following order, first to last: Document 1, Document 5, Document 7, Document 13, Document 11, Document 17.

Note that in one embodiment, flush manager 304 directs replicator 110 to flush (copy) copied data items 314 from intermediate storage structure 114 to merged partition 116 after all data items are appended to (copied to) intermediate storage structure 114 from the source partitions. In another embodiment, flush manager 304 enables replicator 110 to flush copied data items 314 from intermediate storage structure 114 to merged partition 116 even before the append operation has been completed for all data items (i.e., all data items have not yet been copied to intermediate storage structure 114 from the source partitions). In an embodiment where flush manager 304 starts the flush operation before the append operation is complete, flush manager 304 may confirm that all data items of a particular global identifier have been received from the source partitions before enabling that global identifier to be flushed. This confirmation may be performed in order to preserve copy ordering by target global identifier.

Figure 7:
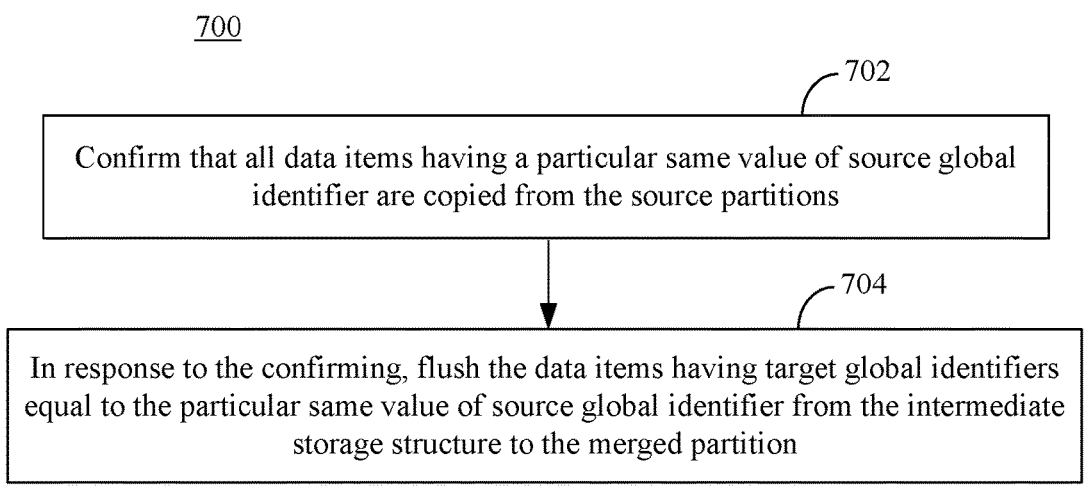
FIG. 7 is a flowchart providing a method for flushing data items of a particular target global identifier, according to an example embodiment.

For instance, FIG. 7 is a flowchart 700 providing a method for flushing data items of a particular target global identifier, according to an example embodiment. In an embodiment, flowchart 700 may be performed by flush manager 304. For the purposes of illustration, flowchart 700 is described with continued reference to FIG. 3.

Flowchart 700 begins with step 702. In step 702, all data items having a particular same value of source global identifier are confirmed to be copied from the source partitions. As mentioned above, in an embodiment, flush manager 304 may confirm that all data items of a particular global identifier have been received from the source partitions before enabling a current global identifier to be flushed. In one example, this confirming can be performed by determining that the next higher global identifier as been received from all source partitions, which thereby confirms that data items having the current global identifier (as source global identifier) have already been received from the source partition, and thus the current (target) global identifier is ready for flushing. Alternatively, flush manager 304 (or replicator 110) may perform a checkpoint operation to communicate with the source partitions (over the communication links) to determine whether any of the source partitions have yet to send over a data item having the current global identifier. The flush of data items having the current global identifier may be performed when all source partitions confirm they have no further data item with the current global identifier to be copied over.

In step 704, in response to the confirming, the data items having target global identifiers equal to the particular same value of source global identifier are flushed from the intermediate storage structure to the merged partition. As mentioned above, after confirming all data items of a particular global identifier have been received from the source partitions, replicator 110 is enabled to flush those data items to merged partition 116.

Figure 8:
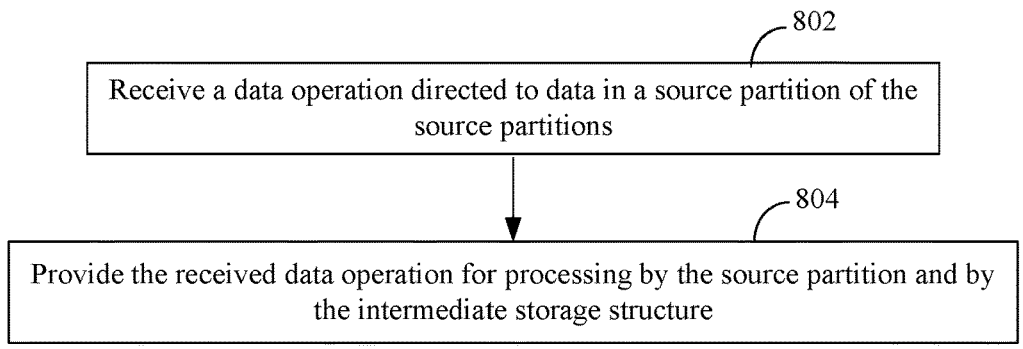
FIG. 8 is a flowchart providing a method for handling data operations received during a partition merging process, according to an example embodiment.

As mentioned elsewhere herein, embodiments enable data queries, including data operations such as writes and reads, to be received and processed to the data items of the source partitions even while the source partitions are being merged into the merged partition. For instance, FIG. 8 is a flowchart 800 providing a method for handling data operations received during a partition merging process, according to an example embodiment. In an embodiment, flowchart 800 may be performed by a query handler, such as query handler 122 of storage device 102A in FIG. 1. For the purposes of illustration, flowchart 800 is described with continued reference to FIG. 3.

Flowchart 800 begins with step 802. In step 802, a data operation directed to data in a source partition of the source partitions is received. For example, as shown in FIG. 1, query handler 122 of storage device 102A in region 120A receives data operation request 118A. Data operation request 118A may be a request for any type of data operation to be performed with respect to one of source partitions 106A-106N involved in the partition merge process. For instance, the data operation may be a write to source partition 106A during the merge process, which would be desired to be persisted in merged partition 116 as well.

In step 804, the received data operation is provided for processing by the source partition and by the intermediate storage structure. In an embodiment, query handler 118A performs the data operation against both the source partition to which data operation request 118A is directed and merged partition 116. For instance, continuing the example of a data write to source partition 106A, query handler 122 writes the data to both source partition 106A and intermediate storage structure 114. In particular, the data operation is stored in source partition 106A and assigned a source global identifier and source local identifier as usual in source partition 106A. Furthermore, the data operation (e.g., written data) is included in copied data items 314, and target identifier generator 306 of FIG. 3 assigns a target global identifier and target local identifier to the data operation, such as according to flowchart 500 of FIG. 5. In such case, target identifier generator 306 may set the target global identifier for the data operation to the source global identifier used for the data operation in source partition 106A (step 502), and may generate a target local identifier for the data operation to be the next available target local identifier in the sequence used for intermediate storage structure 114/merged partition 116 (step 504).

Figure 9:
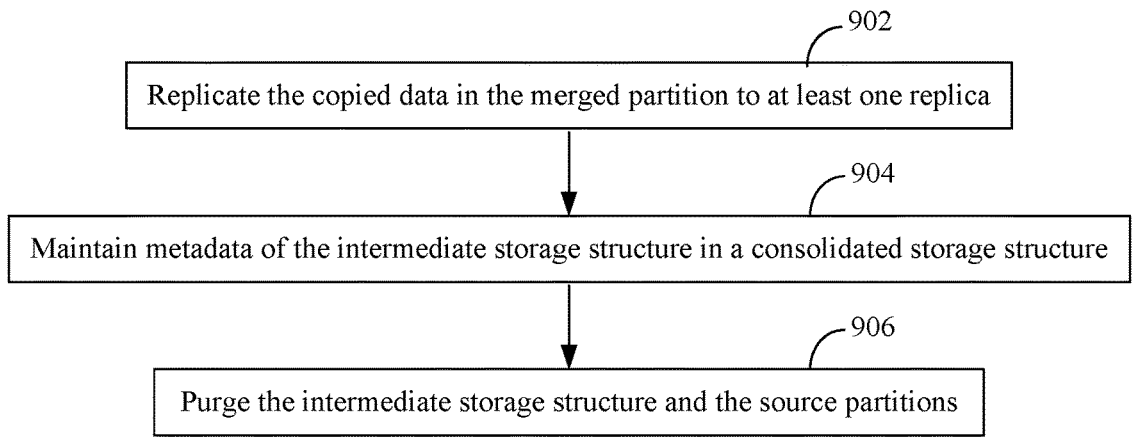
FIG. 9 is a flowchart providing a method for merged partition replication and concluding partition merging, according to an example embodiment.

After the flush is complete, merged partition 116 contains the data items of each of source partitions 110A-110N involved in the partition merge. Further processes may then be performed, including post-processing. For instance, FIG. 9 is a flowchart 900 providing a method for merged partition replication and concluding partition merging, according to an example embodiment. In an embodiment, flowchart 900 may be performed by replicator 110 and partition merge manager 112. Note that not all steps of flowchart 900 need be performed in all embodiments, but instead any one or more of the steps of flowchart 900 may be performed. For the purposes of illustration, flowchart 900 is described with continued reference to FIG. 3.

Flowchart 900 begins with step 902. In step 902, the copied data in the merged partition is replicated to at least one replica. In embodiments, for purposes of protecting against data loss, one or more redundant copies of the data stored in merged partition 116 may be created. As such, one or more of the redundant copies may be accessed in the event the original version is corrupted or lost.

Figure 10:
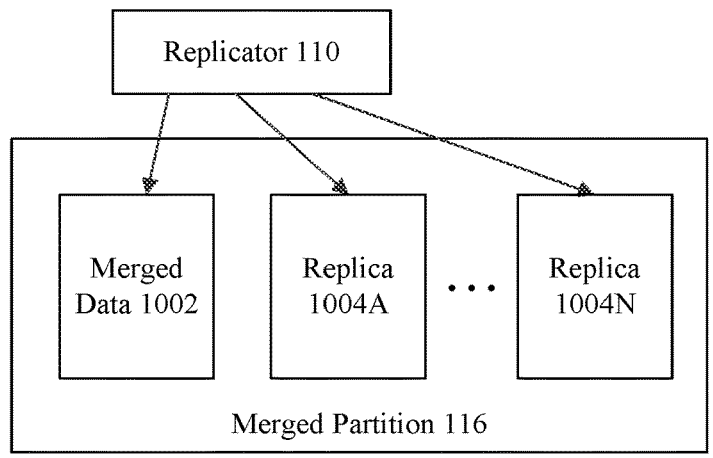
FIG. 10 is a block diagram of a replicator in a storage device configured to replicate a merged partition, according to an example embodiment.

For instance, FIG. 10 is a block diagram of storage device 102 configured to replicate merged partition 116, according to an example embodiment. As shown in FIG. 10, merged partition 116 in storage device 102 stores merged data 1002, which includes the data items copied from the source partitions and consolidated in merged partition 116 during the merge process. In an embodiment, replicator 110 is configured to generate one or more replicas 1004A-1004N of merged data 1002 that are also stored in merged partition 116 (or elsewhere in storage device 102). As such, one or more of replicas 1004A-1004N may be accessed in the event merged data 1002 is corrupted or lost.

It is noted that in one embodiment, the entirety of the data items in the source partitions may be first merged in merged partition 116 as merged data 1002 before replicator 110 generates replicas 1004A-100N. In another embodiment, replicator 110 may generate one or more of replicas 1004A-100N during the flushing process (during step 208 of FIG. 2). In such an embodiment, replicator 110 may replicate each data item to replicas 1004A-100N as the data item is copied to merged data 1002 during the flushing process, may replicate batches of data items to replicas 1004A-100N after the data items of each data batch are written to merged data 1002 during the flushing process, or may replicate the data items according to another schedule.

In step 904, metadata of the intermediate storage structure is maintained in a consolidated storage structure. In an embodiment, metadata 316 of intermediate storage structure 114 may be copied to another storage structure (e.g., another partition or other storage) to be maintained after intermediate storage structure 114 is purged (in step 906 below). Metadata 316 may be maintained in order to translate data queries directed to a source partition of source partitions 110A-110N that no longer exists after the merge process completes. Metadata 316, maintained at the consolidated storage structure, may be accessed to translate the data query, such as by mapping the source global identifier and source local identifier received in the request (for the source partition) to the target global identifier and target local identifier that may be used to access the data item in merged partition 116.

In step 906, the intermediate storage structure and source partitions are purged. In an embodiment, after the partition merge process is complete (and metadata 316 is maintained elsewhere), intermediate storage structure 114 and the source partitions of source partitions 110A-110N merged into merged partition 116 are no longer needed. As such, their storage space may be reclaimed, such as by a garbage collection process or in another manner.

Furthermore, with reference to FIG. 1, the partition merge is performed independently at storage device 102A and 102B in regions 120A and 120B. Source partitions 106A-106N and 108A-108N, which were previously linked (as noted by the dotted lines) as being redundant, geographically separate storage that tracked each other (stored the same data), are purged. Instead, merged partitions 116 in storage devices 102A and 102B are now linked as redundant, geographically separate storage that track each other (store the same data). As such, if a write of data is performed to merged partition 116 in storage device 102A, that data write is transmitted to storage device 102B (from storage device 102A) to also be performed in merged partition 116 at storage device 102B. Likewise, if a write of data is performed to merged partition 116 in storage device 102B, that data write is transmitted to storage device 102A (by storage device 102B) to also be performed in merged partition 116 at storage device 102A.

Accordingly, embodiments save storage space by reclaiming unused or underused partitions, consolidating their stored data in a merge partition. The embodiments disclosed herein may be implemented, combined, and configured in any suitable manner.

For example, in one embodiment, a distributed data system includes a Region A and a Region B. Region A includes hub storage in the form of partition H(P1) and partition H(P2), and Region B includes satellite storage in the form of partition S(P1) and partition S(P2), where H(P1) is linked to S(P1) and H(P2) is linked to S(P2) as geo-linked partition sets. A partition merge process is initiated in Region A to merge H(P1) and H(P2) into merged partition MH(P1,P2) and in Region B to merge S(P1) and S(P2) into merged partition MS(P1,P2).

A Phase 1 (Append) process of the merge may be performed as follows:

Establish a link pairing between source and target. H(P1)→MH and H(P2)→MH/

After the links are established, the data items (e.g., a content store) of sources H(P1) and H(P2) are copied to a target intermediate storage structure (e.g., a merge log) in local order. Any customer writes that happen in parallel with the Append process are send to the source and also sent to the target intermediate storage structure.

Note: Even though ordering is maintained within a link (between a particular source and MH), data operations can be received out of order across the links.

Each such data operation processed by the target intermediate storage structure is assigned a unique identifier (target global and local identifiers). A locally replicated operation is defined as one that is replicated only within a target partition and is unknown to other partitions.

Each append entry in the target intermediate storage structure is assigned a target global identifier of the last locally replicated global identifier, and a target local identifier of the last locally replicated local identifier+1. Such append entries are durable because they are locally replicated to other replicas within the partition.

A Phase 2 (Flush) process of the merge may be performed as follows:

The Flush can be designed as a passive component which runs on a scheduled basis (e.g., timer controlled) similar to any background operation or can be an active component which is controlled by the Append phase.

A flush index is maintained in the merge log on source global identifiers (which are same as the target global identifiers, as noted below). This enables us the flush to be performed in global order even though operations may be received out of order across sources.

After each Append of data items of a particular source global identifier, whether the next source global identifier can be flushed is determined. The next source global identifier may be flushed if a higher source global identifier has been seen across all source links or a checkpoint operation is received across all links. The purpose of checkpoint is to establish an intersection point with disjoint sources.

The flush result to the merged partition MH is replicated to all replicas within the merged partition MH for durability. Flushed entries are assigned a target global identifier equal to the corresponding source global identifier, and the target local identifier is set to the last locally replicated target local identifier+1.

The merge log mentioned above may have the following properties in an embodiment:

Append entries (data items in the intermediate structure) each have a source global identifier set equal to the corresponding last flushed source global identifier.

Flushed entries each have a target global identifier set equal to the corresponding source global identifier.

The local identifiers increase monotonically for each append and flush

The merge log is a replicated durable resource (e.g., a partition that has one or more replicas)

Each append entry is flushed only once.

At the end of merge operation, the number of unflushed entries is zero, meaning all entries appended are flushed to the content store.

III. Example Computer System Implementation

Replicator 110, partition merge manager 112, partition data copier 310, metadata collector 312, append manager 302, flush manager 304, target identifier generator 306, copy order determiner 308, and flowcharts 200, 400, 500, 600, 700, 800 may be implemented in hardware, or hardware combined with one or both of software and/or firmware. For example, replicator 110, partition merge manager 112, partition data copier 310, metadata collector 312, append manager 302, flush manager 304, target identifier generator 306, copy order determiner 308, and flowcharts 200, 400, 500, 600, 700, and/or 800 may be implemented as computer program code/instructions configured to be executed in one or more processors and stored in a computer readable storage medium. Alternatively, replicator 110, partition merge manager 112, partition data copier 310, metadata collector 312, append manager 302, flush manager 304, target identifier generator 306, copy order determiner 308, and flowcharts 200, 400, 500, 600, 700, and/or 800 may be implemented as hardware logic/electrical circuitry.

For instance, in an embodiment, one or more, in any combination, of replicator 110, partition merge manager 112, partition data copier 310, metadata collector 312, append manager 302, flush manager 304, target identifier generator 306, copy order determiner 308, and flowcharts 200, 400, 500, 600, 700, and/or 800 may be implemented together in a SoC, a field programmable gate array (FPGA), an application specific integrated circuit (ASIC), a trusted platform module (TPM), and/or other hardware circuitry. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 11:
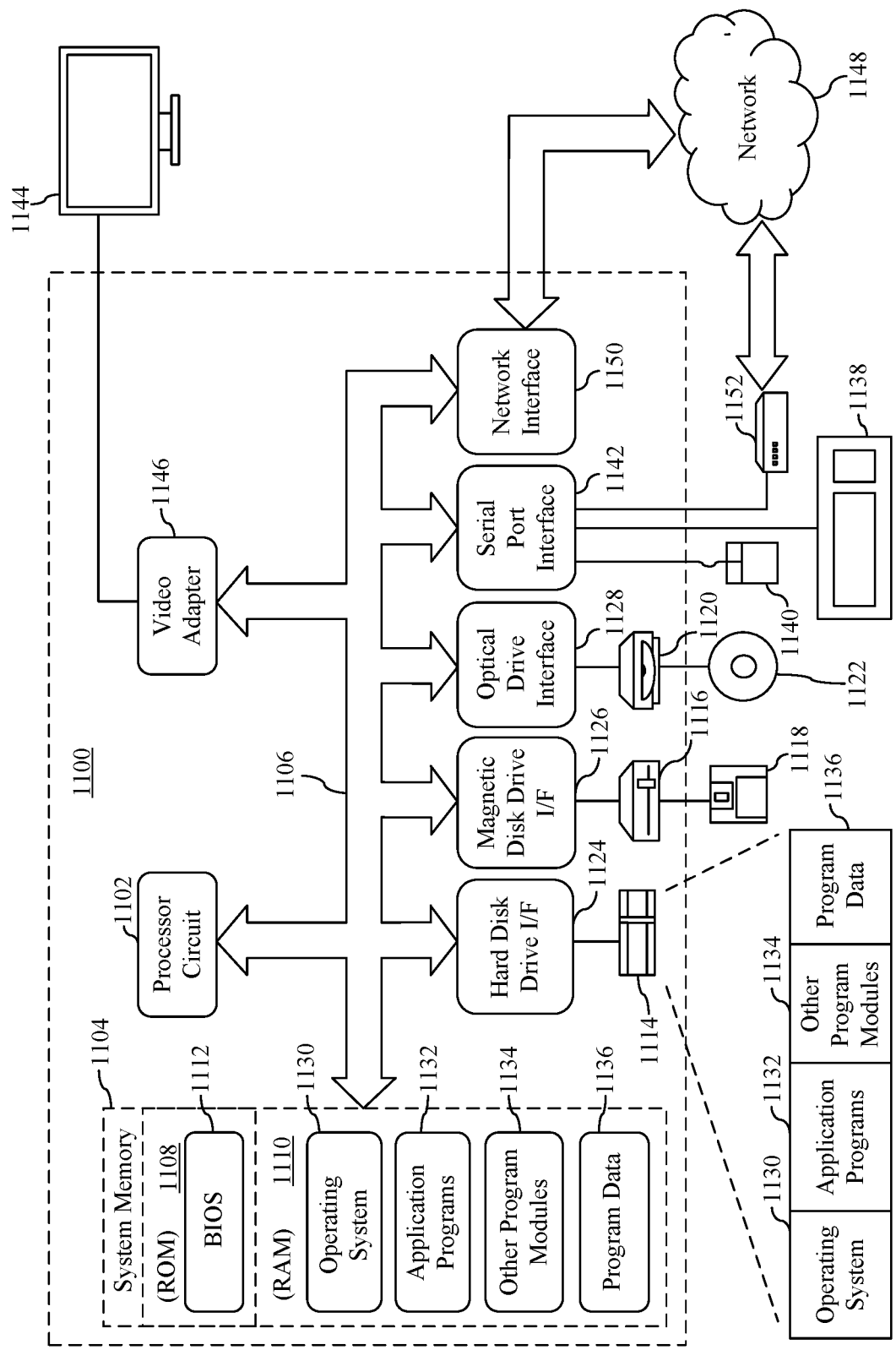
FIG. 11 is a block diagram of an example processor-based computer system that may be used to implement various embodiments.

FIG. 11 depicts an exemplary implementation of a computing device 1100 in which embodiments may be implemented. For example, user devices 104A-104D and storage devices 102, 102A, and 102B may each include aspects of computing device 1100. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing replicator 110, partition merge manager 112, partition data copier 310, metadata collector 312, append manager 302, flush manager 304, target identifier generator 306, copy order determiner 308, and flowcharts 200, 400, 500, 600, 700, and/or 800, and/or further embodiments described herein.

A user may enter commands and information into computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

III. Additional Examples and Advantages

In an embodiment, a storage device comprises: a partition merge manager configured to perform a merge a plurality of source partitions into a merged partition, each source partition storing a plurality of data items having corresponding source global identifiers and corresponding source local identifiers, the partition merge manager comprising: an append manager configured to append the data items with corresponding metadata from the source partitions to an intermediate storage structure in an order defined by the source local identifiers, the append manager including a target identifier generator configured to generate target global identifiers and target local identifiers for each of the data items in the intermediate storage structure; and a flush manager configured to flush the copied data items from the intermediate storage structure to the merged partition in an order defined by the target global identifiers.

In an embodiment, for each source partition, the append manager is configured to: cause a replicator to copy the data items of the source partition with corresponding metadata to the intermediate storage structure in an order defined by their source local identifiers, the corresponding metadata for each data item including a corresponding source global identifier, a corresponding source local identifier, and a timestamp; and include the target global identifier and target local identifier generated for each copied data item in the metadata corresponding to the copied data item.

In an embodiment, the target identifier generator is configured to: set the target global identifier of the copied data item to the source global identifier of the copied data item; and set the target local identifier of the copied data item to a next available local identifier in a sequence of available local identifiers for the merged partition.

In an embodiment, the flush manager comprises: a copy order determiner configured to maintain a flush index in the intermediate data structure that lists the copied data items in the intermediate storage structure in an order defined by the target global identifiers; and flush the copied data items from the intermediate storage structure according to the flush index.

In an embodiment, the flush manager is configured to perform the flush in parallel with the append manager performing the append.

In an embodiment, flush manager comprises: a copy order determiner configured to confirm that all data items having a particular same value of source global identifier are copied from the source partitions; and in response to the confirm, flush the data items having target global identifiers equal to the particular same value of source global identifier from the intermediate storage structure to the merged partition.

In an embodiment, the storage device further comprises: a query handler configured to receive a data operation directed to data in a source partition of the source partitions; and provide the received data operation for processing by the source partition and by the intermediate storage structure.

In another embodiment, a method in a storage device comprises: receiving a request to merge a plurality of source partitions into a merged partition, each source partition storing a plurality of data items having corresponding source global identifiers and corresponding source local identifiers; appending the data items with corresponding metadata from the source partitions to an intermediate storage structure in an order defined by the source local identifiers; generating target global identifiers and target local identifiers for each of the data items in the intermediate storage structure; and flushing the copied data items from the intermediate storage structure to the merged partition in an order defined by the target global identifiers.

In an embodiment, the appending comprises for each source partition: copying the data items of the source partition with corresponding metadata to the intermediate storage structure in an order defined by their source local identifiers, the corresponding metadata for each data item including a corresponding source global identifier, a corresponding source local identifier, and a timestamp; and including the target global identifier and target local identifier generated for each copied data item in the metadata corresponding to the copied data item.

In an embodiment, the generating comprises: setting the target global identifier of the copied data item to the source global identifier of the copied data item; and setting the target local identifier of the copied data item to a next available local identifier in a sequence of available local identifiers for the merged partition.

In an embodiment, the flushing comprises: maintaining a flush index in the intermediate data structure that lists the copied data items in the intermediate storage structure in an order defined by the target global identifiers; and flushing the copied data items from the intermediate storage structure according to the flush index.

In an embodiment, the method further comprises: performing said flushing in parallel with said appending.

In an embodiment, the performing comprises: confirming that all data items having a particular same value of source global identifier are copied from the source partitions; and in response to said confirming, flushing the data items having target global identifiers equal to the particular same value of source global identifier from the intermediate storage structure to the merged partition.

In an embodiment, the method further comprises: receiving a data operation directed to data in a source partition of the source partitions; and providing the received data operation for processing by the source partition and by the intermediate storage structure.

In an embodiment, the method further comprises: replicating the copied data in the merged partition to at least one replica; maintaining metadata of the intermediate storage structure in a consolidated storage structure; and purge the intermediate storage structure and the source partitions.

In another embodiment, a computer-readable storage medium comprises computer-executable instructions that, when executed by a processor, perform a method comprising: receiving a request to merge a plurality of source partitions into a merged partition, each source partition storing a plurality of data items having corresponding source global identifiers and corresponding source local identifiers; appending the data items with corresponding metadata from the source partitions to an intermediate storage structure in an order defined by the source local identifiers; generating target global identifiers and target local identifiers for each of the data items in the intermediate storage structure; and flushing the copied data items from the intermediate storage structure to the merged partition in an order defined by the target global identifiers.

In an embodiment, the appending comprises for each source partition: copying the data items of the source partition with corresponding metadata to the intermediate storage structure in an order defined by their source local identifiers, the corresponding metadata for each data item including a corresponding source global identifier, a corresponding source local identifier, and a timestamp; and including the target global identifier and target local identifier generated for each copied data item in the metadata corresponding to the copied data item.

In an embodiment, the generating comprises: setting the target global identifier of the copied data item to the source global identifier of the copied data item; and setting the target local identifier of the copied data item to a next available local identifier in a sequence of available local identifiers for the merged partition.

In an embodiment, the flushing comprises: maintaining a flush index in the intermediate data structure that lists the copied data items in the intermediate storage structure in an order defined by the target global identifiers; and flushing the copied data items from the intermediate storage structure according to the flush index.

In an embodiment, the computer-readable storage medium further comprises: performing said flushing in parallel with said appending.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A storage device, comprising:
at least one processor circuit;
at least one memory that stores program code configured to be executed by the at least one processor circuit, the program code comprising:
　a partition merge manager configured to perform a merge a plurality of source partitions into a merged partition, each source partition storing a plurality of data items having corresponding source global identifiers and corresponding source local identifiers, the partition merge manager comprising:
　　an append manager configured to append the data items from the plurality of source partitions to an intermediate storage structure in an order defined by the source local identifiers, the data items appended to the intermediate storage structure with corresponding metadata, the append manager including
　　　a target identifier generator configured to generate target global identifiers and target local identifiers, including generating a target global identifier and a target local identifier for each data item of the data items in the intermediate storage structure;
　　a flush manager configured to flush the appended data items from the intermediate storage structure to the merged partition in an order defined by the target global identifiers, the flush manager enabling the unused storage space of the plurality of source partitions and the intermediate storage structure to be reclaimed.

2. The storage device of claim 1, wherein for each source partition, the append manager is configured to:
　cause a replicator to copy the data items of the source partition with corresponding metadata to the intermediate storage structure in an order defined by their source local identifiers, the corresponding metadata for each data item including a corresponding source global identifier, a corresponding source local identifier, and a timestamp; and
　include the target global identifier and target local identifier generated for each appended data item in the metadata corresponding to the appended data item.

3. The storage device of claim 2, wherein the target identifier generator is configured to:
　set the target global identifier of the appended data item to the source global identifier of the appended data item; and
　set the target local identifier of the appended data item to a next available local identifier in a sequence of available local identifiers for the merged partition.

4. The storage device of claim 1, wherein the flush manager comprises:
　a copy order determiner configured to
　　maintain a flush index in the intermediate data structure that lists the appended data items in the intermediate storage structure in an order defined by the target global identifiers; and
　　flush the appended data items from the intermediate storage structure according to the flush index.

5. The storage device of claim 1, wherein the flush manager is configured to perform the flush in parallel with the append manager performing the append.

6. The storage device of claim 5, wherein the flush manager comprises:
　a copy order determiner configured to
　　confirm that all data items having a particular same value of source global identifier are copied from the plurality of source partitions; and
　　in response to the confirm, flush the data items having target global identifiers equal to the particular same value of source global identifier from the intermediate storage structure to the merged partition.

7. The storage device of claim 1, further comprising:
a query handler configured to
　receive a data operation directed to data in a source partition of the plurality of source partitions; and
　provide the received data operation for processing by the source partition and by the intermediate storage structure.

8. A method in a storage device, comprising:
receiving a request to merge a plurality of source partitions into a merged partition, each source partition storing a plurality of data items having corresponding source global identifiers and corresponding source local identifiers;
appending the data items from the plurality of source partitions to an intermediate storage structure in an order defined by the source local identifiers, the data items appended to the intermediate storage structure with corresponding metadata;
generating target global identifiers and target local identifiers, said generating including generating a target global identifier and a target local identifier for each data item of the data items in the intermediate storage structure;

flushing the appended data items from the intermediate storage structure to the merged partition in an order defined by the target global identifiers; and reclaiming unused storage space of the plurality of source partitions and the intermediate storage structure.

9. The method of claim 8, wherein said appending comprises for each source partition:

copying the data items of the source partition with corresponding metadata to the intermediate storage structure in an order defined by their source local identifiers, the corresponding metadata for each data item including a corresponding source global identifier, a corresponding source local identifier, and a timestamp; and including the target global identifier and target local identifier generated for each appended data item in the metadata corresponding to the appended data item.

10. The method of claim 9, wherein said generating comprises:

setting the target global identifier of the appended data item to the source global identifier of the appended data item; and setting the target local identifier of the appended data item to a next available local identifier in a sequence of available local identifiers for the merged partition.

11. The method of claim 8, wherein said flushing comprises:

maintaining a flush index in the intermediate data structure that lists the appended data items in the intermediate storage structure in an order defined by the target global identifiers; and flushing the appended data items from the intermediate storage structure according to the flush index.

12. The method of claim 8, further comprising:

performing said flushing in parallel with said appending.

13. The method of claim 12, wherein said performing comprises:

confirming that all data items having a particular same value of source global identifier are copied from the plurality of source partitions; and in response to said confirming, flushing the data items having target global identifiers equal to the particular same value of source global identifier from the intermediate storage structure to the merged partition.

14. The method of claim 8, further comprising:

receiving a data operation directed to data in a source partition of the plurality of source partitions; and providing the received data operation for processing by the source partition and by the intermediate storage structure.

15. The method of claim 8, further comprising:

replicating the copied data in the merged partition to at least one replica;

maintaining metadata of the intermediate storage structure in a consolidated storage structure; and purge the intermediate storage structure and the plurality of source partitions.

16. A computer-readable storage medium comprising computer-executable instructions that, when executed by a processor, perform a method comprising:

receiving a request to merge a plurality of source partitions into a merged partition, each source partition storing a plurality of data items having corresponding source global identifiers and corresponding source local identifiers;

appending the data items from the plurality of source partitions to an intermediate storage structure in an order defined by the source local identifiers, the data items appended to the intermediate storage structure with corresponding metadata;

generating target global identifiers and target local identifiers, said generating including generating a target global identifier and a target local identifier for each data item of the data items in the intermediate storage structure;

flushing the appended data items from the intermediate storage structure to the merged partition in an order defined by the target global identifiers; and reclaiming unused storage space of the plurality of source partitions and the intermediate storage structure.

17. The computer-readable storage medium of claim 16, wherein said appending comprises for each source partition:

copying the data items of the source partition with corresponding metadata to the intermediate storage structure in an order defined by their source local identifiers, the corresponding metadata for each data item including a corresponding source global identifier, a corresponding source local identifier, and a timestamp; and including the target global identifier and target local identifier generated for each appended data item in the metadata corresponding to the appended data item.

18. The computer-readable storage medium of claim 17, wherein said generating comprises:

setting the target global identifier of the appended data item to the source global identifier of the appended data item; and setting the target local identifier of the appended data item to a next available local identifier in a sequence of available local identifiers for the merged partition.

19. The computer-readable storage medium of claim 16, wherein said flushing comprises:

maintaining a flush index in the intermediate data structure that lists the appended data items in the intermediate storage structure in an order defined by the target global identifiers; and flushing the appended data items from the intermediate storage structure according to the flush index.

20. The computer-readable storage medium of claim 16, further comprising:

performing said flushing in parallel with said appending.

* * * * *